UNITED STATES PATENT OFFICE 2,417,100

UNSATURATED BICYCLIC GLYCOLS

Herman A. Bruson, Rydal, and Warren D. Niederhauser and Hyman Iserson, Philadelphia, Pa., assignors to The Resinous Products & Chemical Company, Philadelphia, Pa., a corporation of Delaware No Drawing. Application November 9, 1945, Serial No. 627,773

3 Claims. (Cl. 260—617)

This invention relates to unsaturated bicyclic glycols having the formula:

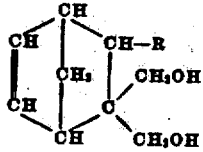

wherein R is hydrogen or a methyl group.

These new compounds are useful as intermediates for the manufacture of synthetic resins and plastics, as insect repellents, and as intermediates for the preparation of insecticides.

According to this invention, the above glycols are obtained by reacting formaldehyde in the presence of alkaline condensing agents with the addition products of cyclopentadiene and acrolein or crotonaldehyde, of the Diels-Alder type, having the formula:

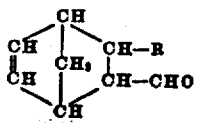

wherein R is hydrogen or a methyl group.

Typical alkaline condensing agents for the purpose are the hydroxides of the alkali metals and of the alkaline earth metals, such as sodium hydroxide, potassium hydroxide, calcium hydroxide, strontium hydroxide, or barium hydroxide, or carbonates of the alkali metals, notably sodium carbonate and potassium carbonate. Quaternary ammonium hydroxides, such as benzyl trimethyl ammonium hydroxide or dibenzyl dimethyl ammonium hydroxide, can also be used.

Formaldehyde may be used in the form of an aqueous solution, the 30% to 40% solutions of commerce being particularly suitable, or may be supplied from a polymer such as paraformaldehyde.

The reaction is conveniently effected in aqueous or solvent solution at temperatures from about 20° up to 80° C. Since the reaction is exothermic, it is desirable to control the reaction with external cooling or by slow mixing. The alkaline catalyst is then destroyed and the glycol separated. The products may be purified by recrystallization with separation of cis- and trans-isomers.

The following examples illustrate the invention:

Example 1

To a rapidly stirred mixture of 61 grams of 2,5 - endomethylene-Δ³ - tetrahydrobenzaldehyde, 200 cc. of water, and 30 grams of paraformaldehyde, there was added 56 grams of calcium hydroxide during the course of 35 minutes. During the addition, the temperature rose gradually to 50° C. Stirring was continued for one and one-half hours longer, and the mixture was allowed to stand for eighteen hours at room temperature. The solid material was filtered off by suction and mixed with dilute hydrochloric acid to dissolve part of the solids. The remaining solid material was washed with cold water, dried, and distilled in vacuo.

The product distilled at 142°–155° C. (2–3 mm.) and solidified to a colorless, waxy, crystalline solid having the formula:

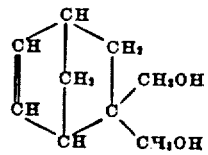

Upon recrystallization from a benzene-petroleum ether mixture, it formed white needles melting at 113°–114° C.

Example 2

To a stirred solution of 96 grams of 50% aqueous sodium hydroxide cooled to 10° C., there was added a solution of 122 grams of 2,5-endomethylene-Δ³-tetrahydrobenzaldehyde, 194 grams of 37% aqueous formaldehyde, and 104 grams of ethanol during the course of one hour while the reaction temperature was maintained at 20°–35° C. with cooling. The mixture was then stirred and heated at 50°–60° C. for two and one-half hours. After being cooled to room temperature, the mixture was acidified with dilute hydrochloric acid.

The glycol crystallized on cooling in an ice bath and was filtered off. The ethanol was distilled off from the filtrate, and the residue was cooled in an ice bath. The solid which separated from the residue was filtered off and added to the glycol obtained above. The yield of crude product thus obtained was 86 grams. It melted at 107°–110° C. After recrystallization from benzene-petroleum ether, the pure product melted at 113°–114° C. as in Example 1.

Example 3

To a stirred solution of 96 grams of aqueous 50% sodium hydroxide which was cooled to 10° C., there was added a solution of 136 grams of 2,5-endomethylene-6-methyl-Δ³-tetrahydrobenzaldehyde, 194 grams of 37% aqueous formaldehyde, and 370 grams of ethanol. The temperature was maintained at 20°–30° C. during the addition, which required one hour. The mixture was then heated at 50°–60° C. for one and one-quarter hours, cooled, and acidified with 10% hydrochloric acid. The alcohol and water were evaporated off in vacuo. The oily product which remained was washed with cold water and distilled in vacuo. The desired glycol having the formula:

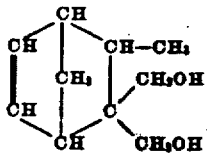

distilled at 135°–155° C. (1–3 mm.) and crystallized from petroleum ether. The crystals obtained melted at 69°–71° C. They were dissolved in warm nitromethane. The crystals obtained therefrom melted at 115°–116° C. A second recrystallization from nitromethane gave crystals melting at 121° C. and, upon repeated crystallization, the crystals obtained continued to melt at this temperature. This behavior is due to a separation of the less soluble isomer of the cyclic glycol.

The unsaturated aldehydes used in the above examples are obtainable by heating cyclopentadiene with acrolein or crotonaldehyde as described by Diels and Alder, Annalen der Chemie, 460, 119 (1928).

We claim:

1. As a new compound, an unsaturated bicyclic glycol having the formula:

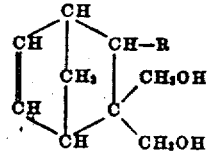

wherein R is selected from a member of the class consisting of hydrogen and the methyl group.

2. As a new compound, the unsaturated bicyclic glycol having the formula:

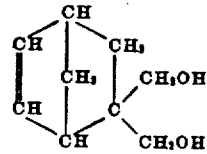

3. As a new compound, the unsaturated bicyclic glycol having the formula:

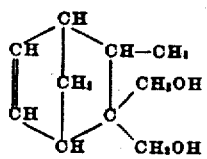

HERMAN A. BRUSON.
WARREN D. NIEDERHAUSER.
HYMAN ISERSON.